(12) United States Patent
Tang et al.

(10) Patent No.: US 10,389,286 B2
(45) Date of Patent: Aug. 20, 2019

(54) METHODS AND SYSTEMS FOR CONTROL OF PARALLEL CONNECTED MOTOR DRIVES

(71) Applicants: Schlumberger Technology Corporation, Sugar Land, TX (US); Board of Regents, The University of Texas System, Austin, TX (US)

(72) Inventors: Zhuangyao Tang, Plano, TX (US); Bilal Akin, Richardson, TX (US); Xuedong Yang, Sugar Land, TX (US); Maxim Klyuzhev, Houston, TX (US)

(73) Assignees: SCHLUMBERGER TECHNOLOGY CORPORATION, Sugar Land, TX (US); BOARD OF REGENTS/THE UNIVERSITY OF TEXAS SYSTEM, Austin, TX (US)

( * ) Notice: Subject to any disclaimer, the term of this patent is extended or adjusted under 35 U.S.C. 154(b) by 482 days.

(21) Appl. No.: 15/063,228

(22) Filed: Mar. 7, 2016

(65) Prior Publication Data

US 2017/0257048 A1    Sep. 7, 2017

(51) Int. Cl.
| | |
|---|---|
| H02P 5/74 | (2006.01) |
| H02P 6/04 | (2016.01) |
| E21B 23/14 | (2006.01) |
| E21B 41/00 | (2006.01) |
| H02P 21/00 | (2016.01) |
| H02P 21/18 | (2016.01) |
| H02P 21/22 | (2016.01) |

(Continued)

(52) U.S. Cl.
CPC .............. *H02P 21/18* (2016.02); *E21B 23/14* (2013.01); *E21B 41/00* (2013.01); *H02P 5/74* (2013.01); *H02P 21/00* (2013.01); *H02P 21/22* (2016.02); *H02P 27/06* (2013.01); *H02P 2006/045* (2013.01)

(58) Field of Classification Search
CPC ....... H01L 2924/00; H01L 2924/00014; H01L 2924/0002; Y02T 10/7005; H02T 10/7077
See application file for complete search history.

(56) References Cited

U.S. PATENT DOCUMENTS

| | | | |
|---|---|---|---|
| 2012/0217912 A1* | 8/2012 | Wu | H02P 6/20 318/400.04 |
| 2013/0096746 A1* | 4/2013 | Hussain | B60W 10/02 701/22 |
| 2014/0327379 A1* | 11/2014 | Yang | H02P 6/18 318/400.02 |

\* cited by examiner

*Primary Examiner* — Shawki S Ismail
*Assistant Examiner* — Zoheb Imtiaz
(74) *Attorney, Agent, or Firm* — Eileen Pape

(57) ABSTRACT

A method of controlling a plurality of permanent magnet synchronous motors using a single inverter that includes obtaining an estimate of rotor position and speed individually for a plurality of permanent magnet synchronous motors. The method can include calculating the average rotor position from the obtained estimate of the rotor position for each permanent magnet synchronous motor of the plurality of permanent magnet synchronous motors. The method can include reconstructing a rotor permanent-magnet flux for each permanent magnet synchronous motor and transforming the reconstructed rotor permanent-magnet flux for each permanent magnet synchronous motor to average fluxes and average differential fluxes on an average d-q reference frame. The method can include obtaining the average current reference in the average d-q reference frame (Continued)

for the plurality of permanent magnet synchronous motors; and determining an inverter voltage reference.

6 Claims, 6 Drawing Sheets

(51) Int. Cl.
*H02P 27/06* (2006.01)
*B62D 5/04* (2006.01)

METHODS AND SYSTEMS FOR CONTROL OF PARALLEL CONNECTED MOTOR DRIVES

FIELD OF THE DISCLOSURE

The disclosure generally relates to methods and systems for controlling parallel connected motor drives.

BACKGROUND

Transport assemblies may require several motors connected in parallel to meet operation requirements. Transport assemblies can be used at the surface or in downhole transport assemblies. The downhole transport assemblies are often used in downhole conveyance operations when gravity conveyance is not sufficient to achieve a desired downhole location.

SUMMARY

An example method of controlling a plurality of permanent magnet synchronous motors using a single inverter includes obtaining an estimate of rotor position and speed individually for a plurality of permanent magnet synchronous motors. The method also includes calculating the average rotor position from the obtained estimate of the rotor position for each permanent magnet synchronous motor of the plurality of permanent magnet synchronous motors. The method further includes reconstructing a rotor permanent-magnet flux for each permanent magnet synchronous motor of the plurality of permanent magnet synchronous motors and transforming the reconstructed rotor permanent-magnet flux for each permanent magnet synchronous motor of the plurality of permanent magnet synchronous motors to average and average differential fluxes on an average d-q reference frame. The example method can further include obtaining the average current reference in the average d-q reference frame for the plurality of permanent magnet synchronous motors and determining an inverter voltage reference.

An example method of a system for controlling two permanent magnet synchronous motors ("PMSMs") includes a single voltage inverter. The system also has two permanent magnet synchronous motors in communication with the single voltage inverter and a current reference calculation module configured to calculate an average current and differential current for the two permanent magnet synchronous motors. The system also includes a first rotor position observer configured to estimate the rotor position and speed for one of the permanent magnet synchronous motors and a second rotor position observer configured to estimate the rotor position and speed for the other permanent magnet synchronous motor. The system also includes a rotor flux reconstruction module in communication with the first rotor position observer and the second rotor position observer, wherein the rotor flux reconstruction module is configured to calculate the average rotor position, reconstruct rotor permanent-magnet fluxes and transform the rotor permanent-magnet fluxes to average and average differential fluxes in an average d-q reference.

An example method for controlling a downhole transport assembly includes conveying a downhole toolstring into a wellbore with a downhole transport assembly. The downhole transport assembly is driven by a plurality of permanent magnet synchronous motors. The method also includes obtaining an estimate of rotor position and speed individually for the plurality of permanent magnet synchronous motors. The average rotor position for the obtained estimate of rotor position for each permanent magnet synchronous motor of the plurality of permanent magnet synchronous motors. The example method also includes reconstructing a rotor permanent-magnet flux for each permanent magnet synchronous motor of the plurality of permanent magnet synchronous motors. The method further includes transforming the reconstructed rotor permanent-magnet flux for each permanent magnet synchronous motor of the plurality of permanent magnet synchronous motors to average fluxes and average differential fluxes on an average d-q reference frame. The average current in the average d-q reference frame for the plurality of permanent magnet synchronous motors is obtained, and an inverter voltage reference is determined.

DETAILED DESCRIPTION

Figure 1:
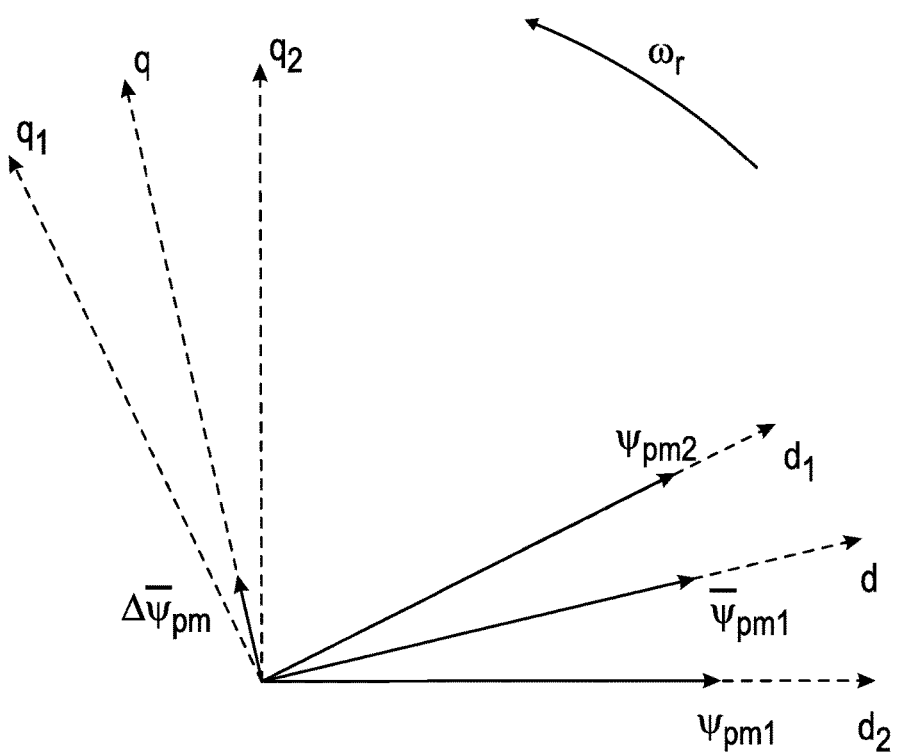
FIG. 1 depicts an average d-q reference frame.

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

An example method of controlling a plurality of permanent magnet synchronous motors ("PMSMS") using a single inverter can include obtaining an estimate of rotor position and speed individually for a plurality of permanent magnet synchronous motors. For example, if two PMSMs are used, two shaft sensors can be used; one of the shaft sensors can be used to estimate the position of the rotor for one of the PMSMs, and the other shaft sensor can estimate the position of the other PMSMs. The shaft sensors can be position sensors provided commercially or future known shaft sensors. For example, the sensors can be provided by Honeywell, Magni-Tec, or other sensor providers. One skilled in the art with the aid of this disclosure would be able to identify the sensor without undue experimentation. In one or more embodiments, the position of each rotor can be estimated using a plurality of rotor position observers. The rotor position observers can be similar to those disclosed herein or others that are now known or future known.

The method can also include calculating the average rotor position from the obtained estimate of the rotor position for each permanent magnet synchronous motor ("PMSM") of the plurality of PMSMs. The average rotor position can be obtained using a rotor flux reconstruction module. The rotor flux reconstruction module is configured to reconstruct the average rotor flux linkage using the obtained estimate of the rotor position for each PMSMs, align the d-axis to the average flux linkage vector direction and transform each quantity in the rotating reference frame to the average d-q reference frame.

The rotor flux reconstruction module can calculate the average rotor position ($\bar{\theta}$) using the following:

$$\bar{\theta} = \frac{\theta_1 + \theta_2}{2}$$

The rotor flux reconstruction module can further reconstruct a rotor permanent-magnet flux for each PMSM of the plurality of PMSMs. For example, the rotor flux reconstruction module can transform the stator flux developed by the stator current into average d-q reference frame using the following equations:

Define C as the transformation matrix from individual motor's d-q reference frame to average d-q reference frame.

$$\psi_{ss(dq)} = L i_{s(dq)}$$

$$\bar{\psi}_{ss(dq)} = C \psi_{ss(dq)}$$
$$= C(L i_{s(dq)})$$
$$= (C L C^{-1}) \bar{i}_{s(dq)}$$
$$= \bar{L} \bar{i}_{s(dq)}$$

Then transform to d-q axis:

$$T_e = \frac{3}{2} p (\bar{\psi}_{sr(d)} \bar{i}_{s(q)} - \bar{\psi}_{sr(q)} \bar{i}_{s(d)} + \Delta\psi_{sr(d)} \Delta i_{s(q)} - \Delta\psi_{sr(q)} \Delta i_{s(d)} +$$
$$\bar{\psi}_{ss(d)} \bar{i}_{s(q)} - \bar{\psi}_{ss(q)} \bar{i}_{s(d)} + \Delta\psi_{ss(d)} \Delta i_{s(q)} - \Delta\psi_{ss(q)} \Delta i_{s(d)})$$
$$= \frac{3}{2} p (\bar{\psi}_{sr(d)} \bar{i}_{s(q)} - \bar{\psi}_{sr(q)} \bar{i}_{s(d)} + \Delta\psi_{sr(d)} \Delta i_{s(q)} - \Delta\psi_{sr(q)} \Delta i_{s(d)} +$$
$$\bar{L} \bar{i}_{s(d)} \bar{i}_{s(q)} - \bar{L} \bar{i}_{s(q)} \bar{i}_{s(d)} + L \Delta i_{s(d)} \Delta i_{s(q)} - L \Delta i_{s(q)} \Delta i_{s(d)})$$
$$= \frac{3}{2} p (\bar{\psi}_{sr(d)} \bar{i}_{s(q)} - \bar{\psi}_{sr(q)} \bar{i}_{s(d)} + \Delta\psi_{sr(d)} \Delta i_{s(q)} - \Delta\psi_{sr(q)} \Delta i_{s(d)})$$

$$\Delta T_e = \frac{3}{2} p (\bar{\psi}_{sr(d)} \Delta i_{s(q)} - \bar{\psi}_{sr(q)} \Delta i_{s(d)} + \Delta\psi_{sr(d)} \bar{i}_{s(q)} - \Delta\psi_{sr(q)} \bar{i}_{s(d)} +$$
$$\bar{\psi}_{ss(d)} \Delta i_{s(q)} - \bar{\psi}_{ss(q)} \Delta i_{s(d)} + \Delta\psi_{ss(d)} \bar{i}_{s(q)} - \Delta\psi_{ss(q)} \bar{i}_{s(d)})$$
$$= \frac{3}{2} p (\bar{\psi}_{sr(d)} \Delta i_{s(q)} - \bar{\psi}_{sr(q)} \Delta i_{s(d)} + \Delta\psi_{sr(d)} \bar{i}_{s(q)} - \Delta\psi_{sr(q)} \bar{i}_{s(d)} +$$
$$\bar{L} \bar{i}_{s(d)} \Delta i_{s(q)} - \bar{L} \bar{i}_{s(q)} \Delta i_{s(d)} + L \Delta i_{s(d)} \bar{i}_{s(q)} - L \Delta i_{s(q)} \bar{i}_{s(d)})$$
$$= \frac{3}{2} p (\bar{\psi}_{sr(d)} \Delta i_{s(q)} - \bar{\psi}_{sr(q)} \Delta i_{s(d)} + \Delta\psi_{sr(d)} \bar{i}_{s(q)} - \Delta\psi_{sr(q)} \bar{i}_{s(d)})$$

$$\bar{\psi}_{sr(q)} = 0$$
$$\Delta\psi_{sr(d)} = 0$$

To sum up:

$$\bar{T}_e = 3/2 p (\bar{\psi}_{sr(d)} \bar{i}_{s(q)} - \Delta\psi_{sr(q)} \Delta i_{s(d)})$$

$$\Delta T_e = 3/2 p (\bar{\psi}_{sr(d)} \Delta i_{s(q)} - \Delta\psi_{sr(q)} \bar{i}_{s(d)})$$

Therefore:

$$\bar{i}_{s(q)} = \frac{\frac{\bar{T}_e}{3} + \Delta\psi_{sr(q)} \Delta i_{s(d)}}{\frac{2}{2} p \bar{\psi}_{sr(d)}}$$

$$\bar{i}_{s(d)} = \frac{-\frac{\Delta T_e}{3} + \bar{\psi}_{sr(d)} \Delta i_{s(q)}}{\frac{2}{2} p \Delta\psi_{sr(q)}}$$

The foregoing variables are further described below.

A current reference calculation module can be configured to obtain an average current reference in the average d-q reference frame for the plurality of permanent magnet synchronous motors. For example, the current reference calculation module can be configured to obtain the average current reference in the average d-q reference frame for the plurality of permanent magnet synchronous motors as follows:

$$\bar{i}_{s(q)} = \frac{\frac{\bar{T}_e}{3} + \Delta\psi_{sr(q)} \Delta i_{s(d)}}{\frac{2}{2} p \bar{\psi}_{sr(d)}}$$

$$\bar{i}_{s(d)} = \frac{-\frac{\Delta T_e}{3} + \bar{\psi}_{sr(d)} \Delta i_{s(q)}}{\frac{2}{2} p \Delta\psi_{sr(q)}}$$

This can be accomplished by reconstruction of the average flux linkage using two separate position observers or shaft sensors, aligning the d-axis to the average flux linkage vector direction, and transforming every quantity in this rotating reference frame.

Using the quantities transformed into the d-q reference the inverter voltage reference can be obtained. The current references on d-q reference frame determine voltage references on the average d-q reference frame (Vd and Vq) through PI controllers. Then, the voltage references on the average d-q reference frame are transformed to voltage references on the stationary α-β reference frame (Vα and Vβ). The SVPWM module uses Vα and Vβ to derive the duty ratio of the inverter bridges (Tabc).

FIG. 1 depicts an average d-q reference frame. The control of two or more permanent magnet synchronous motors (PMSMs) can be accomplished by regulating unified quantities, and controlling the dynamic response of individual PMSMs. For example, a set of unified quantities that describe the plurality of PMSMs is defined that describe all the motors at the same time. Accordingly, properly regulating the unified quantities, allows for optimization and control of the individual motors. An average quantity and average differential quantity ($\bar{Q}$ and $\Delta\bar{Q}$) are defined as in Eq. (1) and Eq. (2), where Q1 and Q2 denote quantities corresponding to motor 1 and motor 2 respectively.

$$\bar{Q} = \frac{Q_1 + Q_2}{2} \quad (1)$$

$$\Delta \bar{Q} = \frac{Q_1 - Q_2}{2} \quad (2)$$

A control algorithm is defined based on the average d-q reference frame. For individual motor's d-q reference frame, the d-axis can be aligned with the rotor position while the d-axis of the average d-q reference frame is aligned with the average rotor permanent-magnet flux linkage ($\overline{\psi}_{pm}$) direction as shown in FIG. 1. Then, every individual, average, or average differential quantity can be transformed to the average d-q reference frame.

Figure 2:
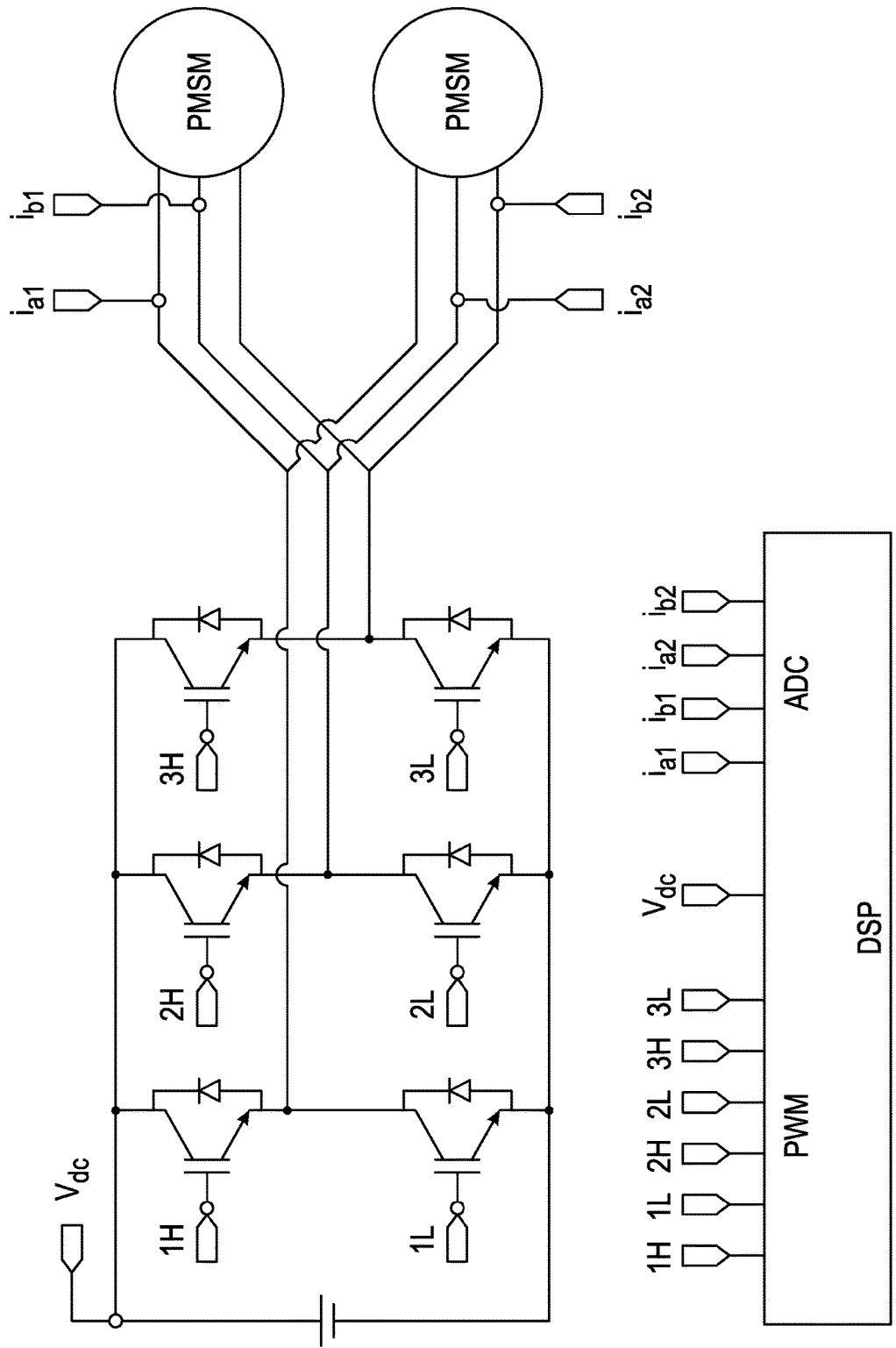
FIG. 2 depicts an example hardware diagram for connection and control of two permanent magnet synchronous motors.

FIG. 2 depicts an example hardware diagram for connection and control of two PMSMs. Phase A and Phase B currents of two motors, $i_{a1}$, $i_{b1}$, $i_{a2}$, and $i_{b2}$ are measured and sampled by the ADC peripherals. DC bus voltage $V_{dc}$ is used to reconstruct the inverter three phase voltages.

Figure 3:
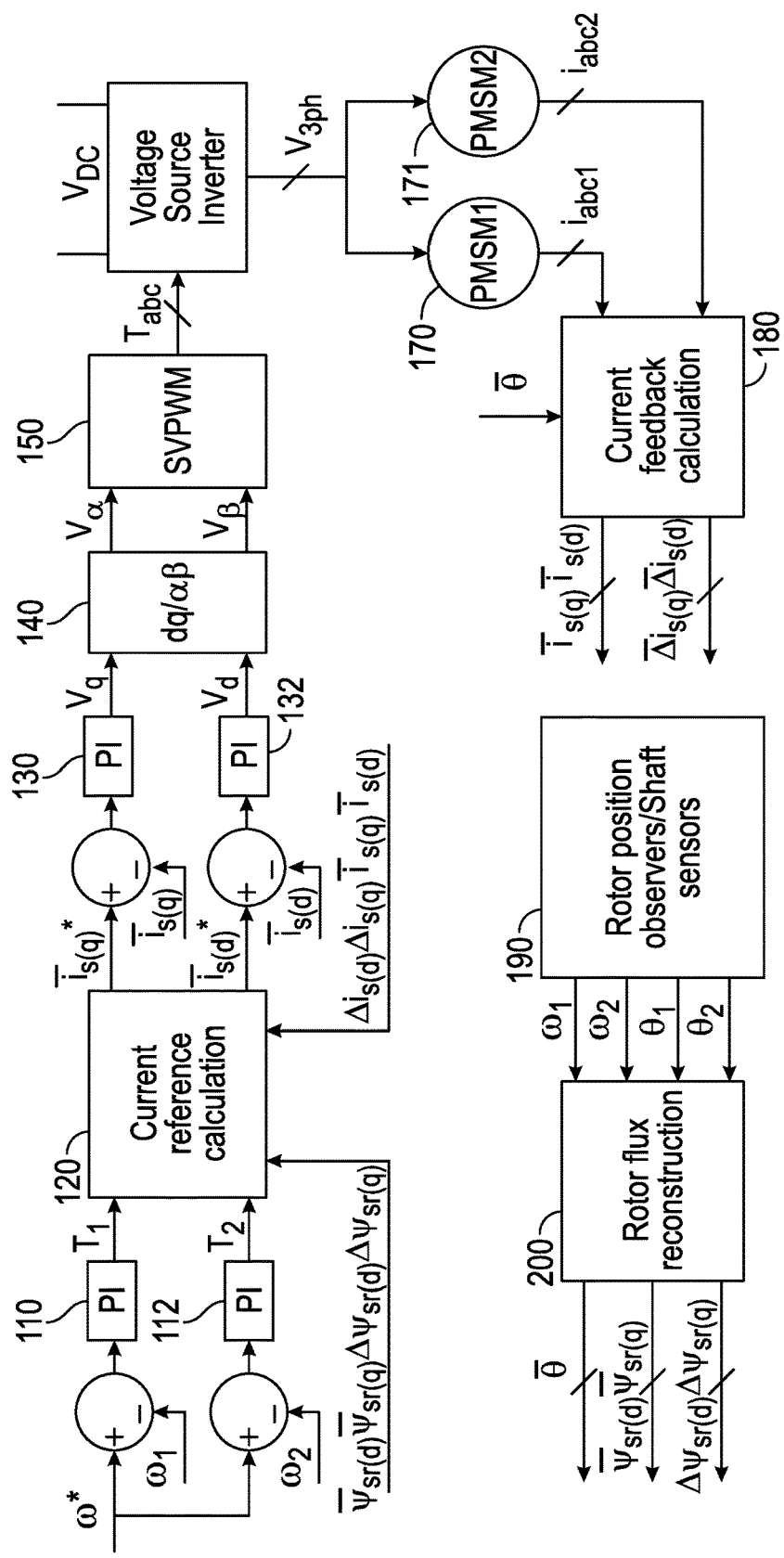
FIG. 3 depicts a block diagram of an example control method of two permanent magnet synchronous motors.

FIG. 3 depicts a block diagram of an example control method of two PMSMs. The individual rotor position and speed of two motors 170 and 171 can be estimated using two observers 190. With individual rotor position information, the average rotor position ($\overline{\theta}$) is achieved using the rotor flux reconstruction module 200. Then, two motors' rotor permanent-magnet fluxes are reconstructed and transformed to average and average differential fluxes in average d-q reference frame as shown in FIG. 3 as $\overline{\psi}_{srd}$, $\overline{\psi}_{srq}$, $\Delta\overline{\psi}_{srd}$, and $\Delta\overline{\psi}_{srq}$. Similarly, the average and average differential currents in average d-q reference frame can also be transformed from individual motor phase currents. The individual torque applied to two motors (T1 and T2) are acknowledged through two speed controllers 110 and 112. Finally, the average current references in average d-q reference frame are calculated and inverter voltage references can be determined through two current PI controllers 130 and 132. At 140 the voltage references on the average d-q reference frame are transformed to voltage references on the stationary α-β reference frame. The SVPWM module 150 uses Vα and Vβ to derive the duty ratio of the inverter bridges. The voltage source inverter is set based on the inverter voltage reference.

The current feedback calculation module 180 transforms feedback current quantities of individual motor to the average d-q reference frame and calculates average and average differential currents on the average d-q reference frame.

The variables identified in FIG. 3 are defined as follows:
ω*: Speed reference
$\omega_1$: Speed of motor1 which comes from the rotor position observer or the shaft sensor.
$\omega_2$: Speed of motor2 which comes from the rotor position observer or the shaft sensor.
$\theta_1$: Rotor position of motor1 which comes from the rotor position observer or the shaft sensor.
$\theta_2$: Rotor position of motor2 which comes from the rotor position observer or the shaft sensor.
$T_1$: Torque of motor 1 which is obtained from PI controller.
$T_2$: Torque of motor 2 which is obtained from PI controller.
$\overline{i}_{s(d)}^*(\overline{i}_{s(q)}^*)$: Current references in the average d-q rotating reference frame. They are determined by the current reference calculation module 120. $\overline{i}_{s(d)}(\overline{i}_{s(q)})$: Feedback average current quantities in the average d-q rotating reference frame. They are transformed from measured currents of both motors by the current feedback calculation module.
$\Delta i_{s(q)}(\Delta i_{s(d)})$: Feedback average differential current quantities in the average d-q rotating reference frame. They are transformed from measured currents of both motors by the current feedback calculation block.
Vd (Vq): Voltage references in the average d-q rotating reference frame.

Va (Vb): Voltage references in the average a-b stationary reference frame.
Tabc: Duty ratios of inverter three-phase bridges.
VDC: DC bus voltage.
V3ph: Inverter three-phase output voltages.
iabc1: Measured three-phase currents of motor1.
iabc2: Measured three-phase currents of motor2.
$\overline{\theta}$: Average rotor position angle.
$\overline{\psi}_{sr(d)}$: reconstructed average rotor flux on the d axis of the average d-q rotating reference frame, and is obtained by the rotor flux reconstruction module.
$\overline{\psi}_{sr(q)}$: reconstructed average rotor flux on the q axis of the average d-q rotating reference frame, and is obtained by the rotor flux reconstruction module.
$\Delta\overline{\psi}_{sr(d)}$: reconstructed average differential rotor flux on the d axis of the average d-q rotating reference frame, and is obtained by the rotor flux reconstruction module.
$\Delta\overline{\psi}_{sr(q)}$: reconstructed average differential rotor flux on the q axis of the average d-q rotating reference frame, and is obtained by the rotor flux reconstruction module.

Figure 4:
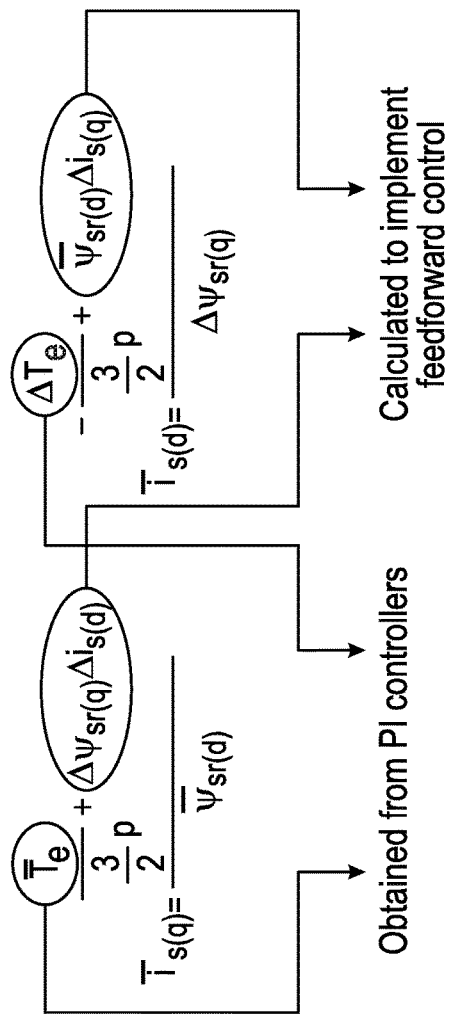
FIG. 4 depicts an example method of a current reference calculation.
Figure 5:
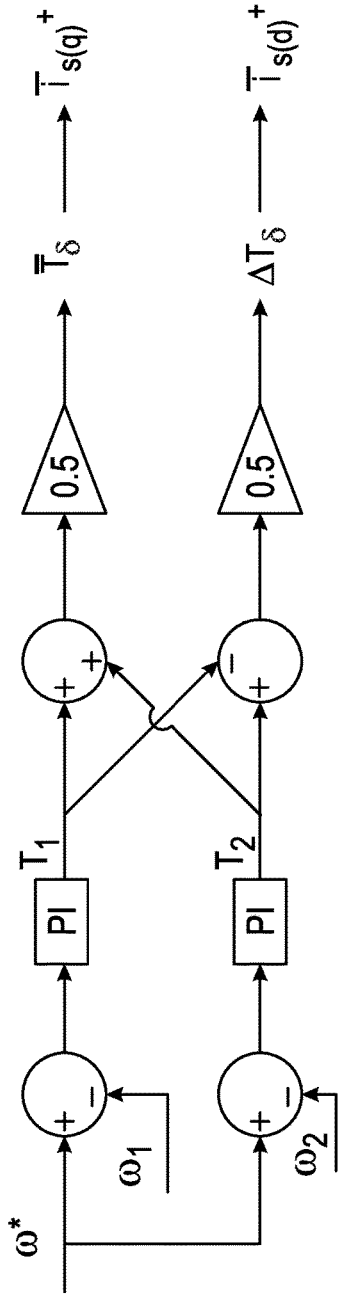
FIG. 5 depicts an example block diagram for deriving average and average differential torque and current references.

FIG. 4 depicts an example method of a current reference calculation. FIG. 5 depicts an example block diagram for deriving average and average differential torque and current references.

Figure 6:
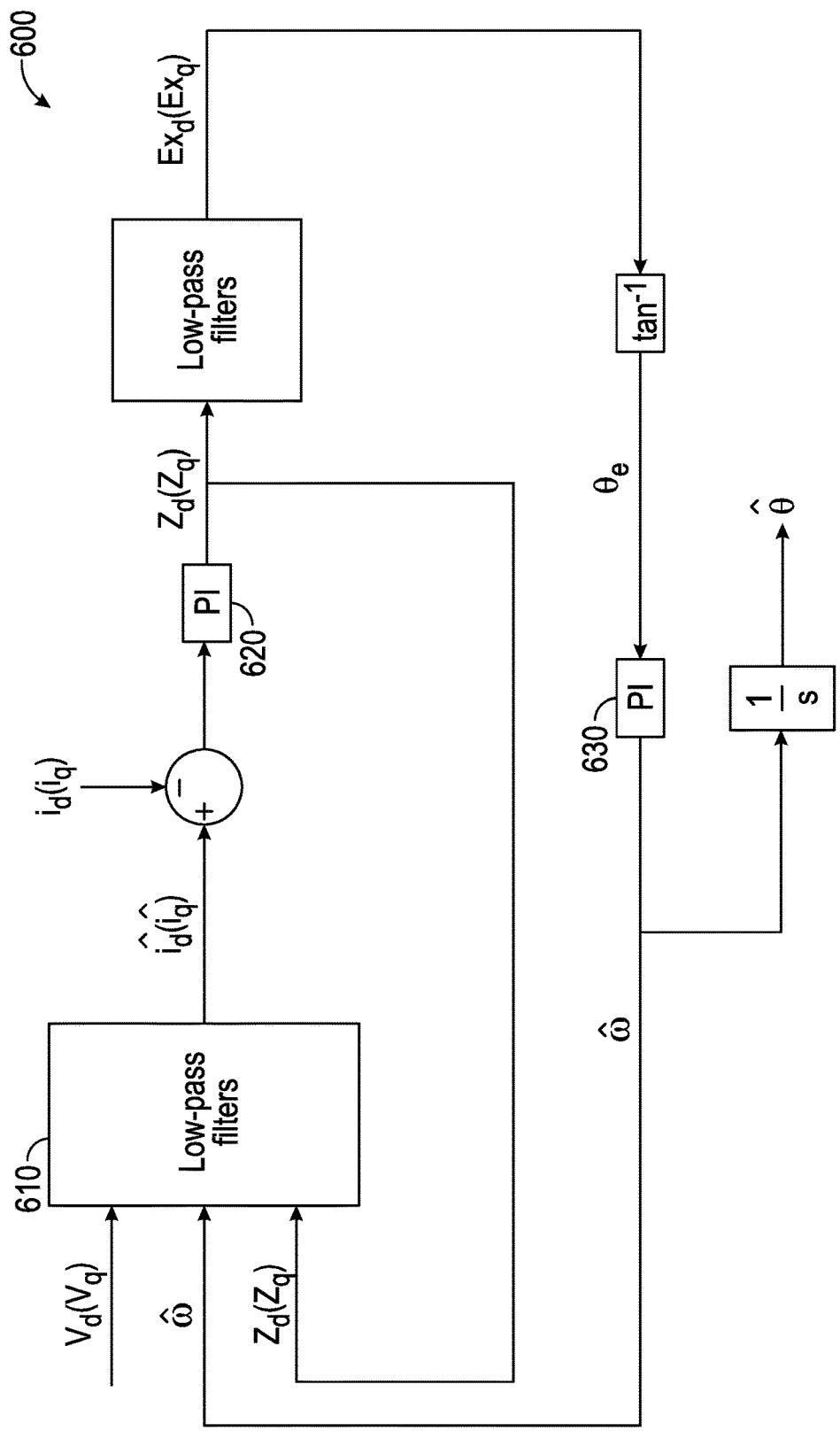
FIG. 6 depicts an example observer block diagram.

FIG. 6 depicts an example observer block diagram. The observer 600 includes a P controller 620, a PI controller 630, and a LPF Model 610. The variables on FIG. 6 are described below.

Vd (Vq): Voltage quantities in the d-q rotating reference frame. This d-q reference frame is determined by the individual rotor position of the individual motor. Vd and Vq are transformed from measured or reconstructed three-phase or two-phase voltages.
ω: Estimated motor electrical angular frequency.
Zd (Zq): Switching vector which comes from P controller 620.
$\hat{i}_d(\hat{i}_q)$: Estimated current quantities in the d-q rotating reference frame.
id (iq): Current quantities in the d-q rotating reference frame transformed from measured three-phase or two-phase currents.
$\hat{\theta}$: Estimated rotor position angle which is integrated from ω.
Exd (Exq): Filtered switching vector which comes from Zd (Zq) after they filtered by low-pass filters.
$\theta_e$: Error between actual rotor position angle and estimated rotor position angle.

LPF Model 610 is a motor system model which is obtained from system modeling. The LPF Model 610 can contain differential equations that describe system characteristics.

Figure 7:
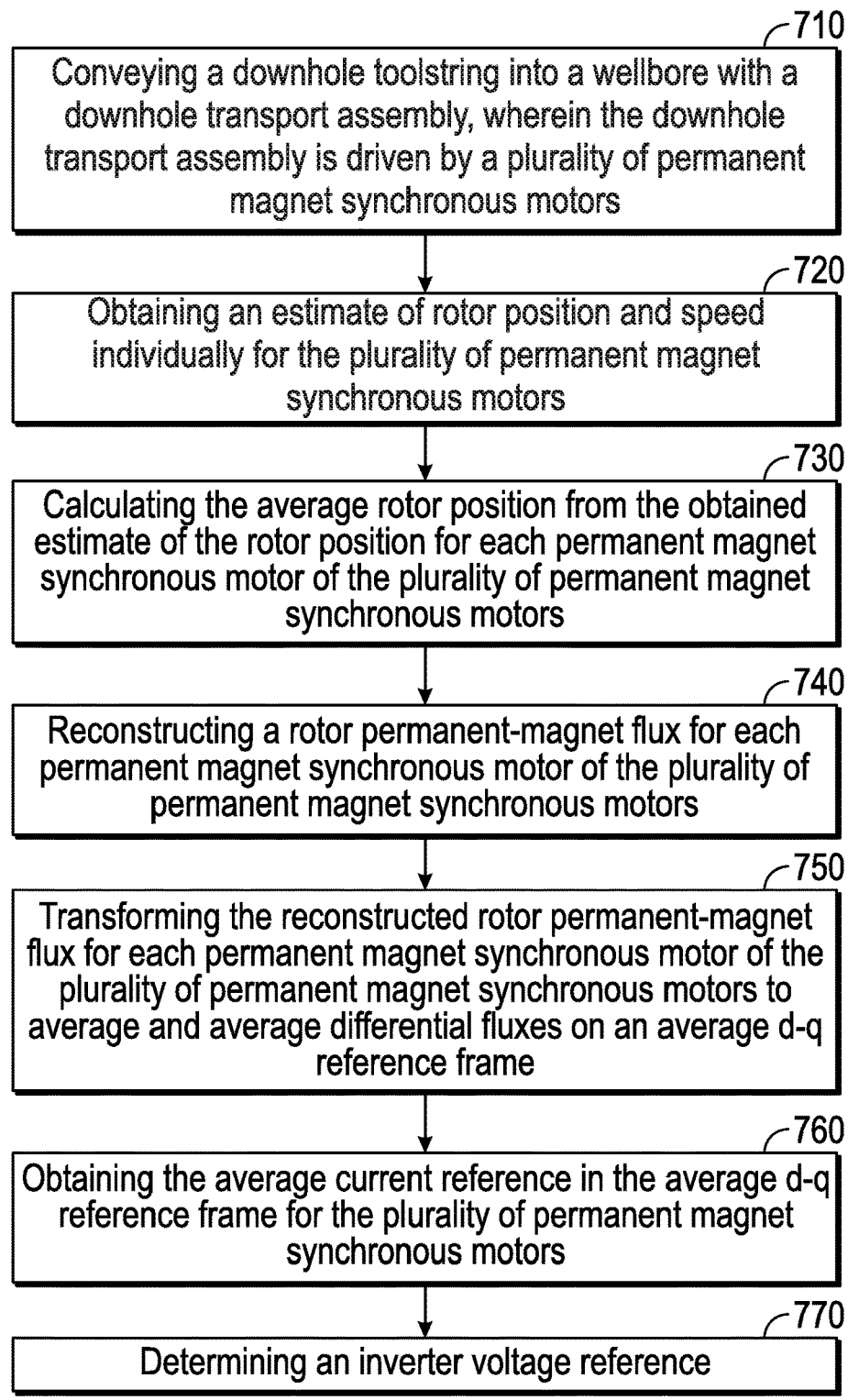
FIG. 7 depicts an example method of controlling a downhole transport assembly.

FIG. 7 depicts an example method of controlling a downhole transport assembly.

The method includes conveying a downhole toolstring into a wellbore with a downhole transport assembly, wherein the downhole transport assembly is driven by a plurality of permanent magnet synchronous motors, Box 710. The downhole transport assembly can be a tractor or similar conveyance device. The transport assembly can be used to convey a logging tool, a mechanical intervention tool or tools, other downhole equipment, or combinations thereof.

The method also includes obtaining an estimate of rotor position and speed individually for the plurality of permanent magnet synchronous motors, Box 720. The method further includes calculating the average rotor position from the obtained estimate of the rotor position for each permanent magnet synchronous motor of the plurality of permanent magnet synchronous motors, Box 730.

The method can further include reconstructing a rotor permanent-magnet flux for each permanent magnet synchronous motor of the plurality of permanent magnet synchronous motors, Box 740. In addition, the method can include transforming the reconstructed rotor permanent-magnet flux for each permanent magnet synchronous motor of the plurality of permanent magnet synchronous motors to average and average fluxes and differential fluxes on an average d-q reference frame, Box 750. The method can further include obtaining the average current reference in the average d-q reference frame for the plurality of permanent magnet synchronous motors, Box 760. At Box 770, the method is shown including determining an inverter voltage reference.

Although example assemblies, methods, systems have been described herein, the scope of coverage of this patent is not limited thereto. On the contrary, this patent covers every method, systems, and article of manufacture fairly falling within the scope of the appended claims either literally or under the doctrine of equivalents.

What is claimed is:

1. A method of controlling a plurality of permanent magnet synchronous motors using a single inverter, wherein the method comprises:
   obtaining an estimate of rotor position and speed individually for a plurality of permanent magnet synchronous motors;
   calculating the average rotor position from the obtained estimate of the rotor position for each permanent magnet synchronous motor of the plurality of permanent magnet synchronous motors;
   reconstructing a rotor permanent-magnet flux for each permanent magnet synchronous motor of the plurality of permanent magnet synchronous motors;
   transforming the reconstructed rotor permanent-magnet flux for each permanent magnet synchronous motor of the plurality of permanent magnet synchronous motors to average fluxes and average differential fluxes on an average d-q reference frame;
   obtaining the average current reference and an inverter voltage reference in the average d-q reference frame for the plurality of permanent magnet synchronous motors; and
   generating voltage to drive the plurality of permanent magnet synchronous motors.

2. The method of claim 1, wherein obtaining the estimate of the rotor position individually for a plurality of permanent magnet synchronous motors comprises: using a plurality of position sensors.

3. The method of claim 1, wherein obtaining the estimate of the rotor position individually for a plurality of permanent magnet synchronous motors comprises: using a plurality of position observers.

4. A system for controlling permanent magnet synchronous motors, wherein the system comprises:
   a single voltage inverter;
   permanent magnet synchronous motors in communication with the single voltage inverter;
   a current reference calculation module configured to calculate an average current and differential current for the permanent magnet synchronous motors;
   a first rotor position observer configured to estimate the rotor position and speed for one of the permanent magnet synchronous motors;
   a second rotor position observer configured to estimate the rotor position and speed for the other permanent magnet synchronous motor; and
   a rotor flux reconstruction module in communication with the first rotor position observer and the second rotor position observer, wherein the rotor flux reconstruction module is configured to calculate the average rotor position, reconstruct rotor permanent-magnet fluxes and transform the rotor permanent-magnet fluxes to average and average differential fluxes in an average d-q reference.

5. The system of claim 4, further comprising speed controllers configured to acknowledge the individual torque applied to the permanent magnet synchronous motors.

6. A method of controlling a downhole transport assembly, wherein the method comprises:
   conveying a downhole toolstring into a wellbore with a downhole transport assembly, wherein the downhole transport assembly is driven by a plurality of permanent magnet synchronous motors;
   obtaining an estimate of rotor position and speed individually for the plurality of permanent magnet synchronous motors;
   calculating the average rotor position from the obtained estimate of the rotor position for each permanent magnet synchronous motor of the plurality of permanent magnet synchronous motors;
   reconstructing a rotor permanent-magnet flux for each permanent magnet synchronous motor of the plurality of permanent magnet synchronous motors;
   transforming the reconstructed rotor permanent-magnet flux for each permanent magnet synchronous motor of the plurality of permanent magnet synchronous motors to average and average fluxes and differential fluxes on an average d-q reference frame;
   obtaining the average current reference and an inverter voltage reference in the average d-q reference frame for the plurality of permanent magnet synchronous motors; and
   generating voltage to drive the plurality of permanent magnet synchronous motors.

* * * * *